Aug. 19, 1947.  R. E. NORTHCUTT  2,426,113
UMBRELLA HOLDER
Filed April 1, 1946
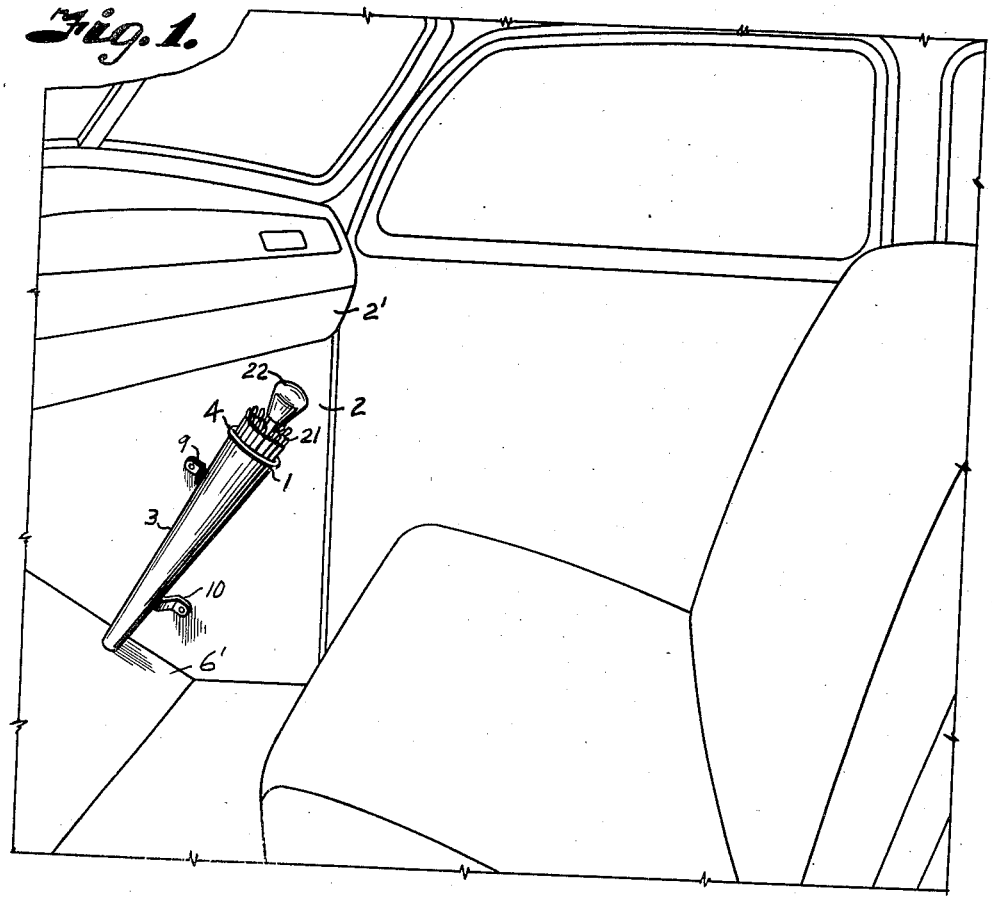
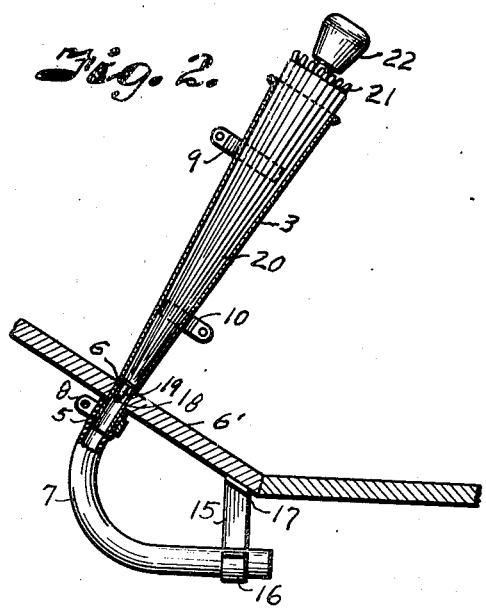
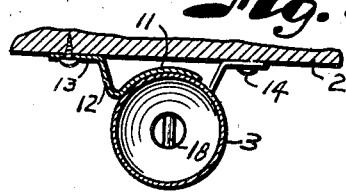
INVENTOR.
Robert E. Northcutt
BY
Fishburn & Mullendore,
ATTORNEYS.

Patented Aug. 19, 1947

2,426,113

UNITED STATES PATENT OFFICE 2,426,113

UMBRELLA HOLDER

Robert E. Northcutt, Kansas City, Mo., assignor of one-half to Morris Y. Wiber

Application April 1, 1946, Serial No. 658,773

3 Claims. (Cl. 224—29)

This invention relates to an umbrella carrier for motor vehicles and has for its principal object of advantageously locating and detachably securing an umbrella in an automobile so that the umbrella is instantly available for use in case of rain.

Other objects of the invention are to provide a device for holding an umbrella in an automobile out of the way of passengers in the automobile; to provide a device which will allow draining of moisture from the umbrella when placed in the holder wet; to provide a holder in which the umbrella may be quickly placed and removed from said holder; to provide a holder in which the moisture from the umbrella will be removed from underneath the floor of the automobile; to provide a device in which a vacuum may be created for withdrawing the moisture from the umbrella; and to provide a device simple, economical to manufacture and efficient in operation.

In accomplishing these and other objects of the present invention, I have provided improved details of structure, the preferred form of which is illustrated in the accompanying drawings wherein:

Fig. 1 is a perspective view of my holder shown mounted in an automobile.

Fig. 2 is a vertical cross section through a device showing the connection for draining of moisture from the umbrella.

Fig. 3 is a transverse cross section through the holder particularly illustrating the ease of fastening the holder to the side of the automobile and the top and bottom of the holder against which the lower end of the umbrella rests.

Referring more in detail to the drawings:

1 designates a holder embodying the features of my invention which is preferably located on the side 2 of the body of an automobile ahead of the door of the vehicle, and particularly in front of the forward seat thereof, and preferably substantially under the instrument panel 2' of the vehicle so that it is out of the way of the occupants of the automobile.

The device consists of a tubular substantially cone-shaped member 3 having a rim 4 at its upper end, the holder being of a length substantially equal to the length of an ordinary umbrella or parasol. The lower end 5 of the cone-shaped tubular member is elongated and extends through an opening 6 in the floorboard 6' of the vehicle to a slight distance below the floorboard and is adapted to receive a tube 7 of rubber or other suitable material which may be attached to the lower end 5 of the tubular member by a clamping member 8 suitable for that purpose.

The cone-shaped tubular member 3 is attached to the side 2 of the automobile by clamping members 9 and 10. The clamping members have rounded portions 11 conforming to the contour of the tubular member 3 bent to form an arm 12 and having a lateral flange 13 provided with an opening to receive set screws or the like 14 for fastening the clamping members to the side of the car as best illustrated in Fig. 3.

The tube 7 is bent and turned rearwardly as shown in Fig. 2 and is secured in place by a bracket 15 having a hook portion 16 to engage the end of the tube 7. The bracket 15 may be attached to the floor of the automobile in any suitable manner as indicated at 17 (Fig. 2).

Located a slight distance from the lower end of the cone-shaped tubular member 3 and substantially even with the floorboard of the vehicle is a transverse pin 18 against which the pointed end 19 of the umbrella 20 is adapted to rest in order to hold the umbrella loosely in the cone-shaped tubular member to prevent stoppage of the tubular member and allow moisture from the umbrella to drain through the tubular member and tube 7. With the tube arranged in the manner shown, a vacuum will be created through the cone-shaped tubular member and tube 7 to draw the moisture from the umbrella therethrough.

The cone-shaped tubular member is of a length and size that will loosely engage the ordinary umbrella and the tips of the stays 21 therein will extend slightly from the upper end of the tubular member as well as the handle member 22 extending therefrom so that the umbrella may be easily grasped for removal from the holder.

With my improved holder the umbrella is held in such a manner that it is free from pounding or chafing against the holder and will thus prevent abrasion of the fabric by rattling or pounding movement.

It will be obvious from the foregoing that I have provided an improved holder for an umbrella located out of the way in an automobile or other vehicle and which will provide for drainage of moisture from the umbrella when placed in the holder in damp or wet condition.

While I have here shown the holder to be tapered or of cone-shape, I do not wish to be limited to such structure as it will be obvious that other forms may be used without departing from the spirit of my invention.

What I claim and desire to secure by Letters Patent is:

1. An umbrella holder comprising, a tubular holding member secured to a support in vertical position and having one end thereof extending through said support, a tubular member engaging said tubular holding member beneath said support, and a pin transversely of the opening in the lower end of the tubular holding member for engaging the end of the umbrella to hold the umbrella loosely therein to allow drainage of moisture from the umbrella through said tubular member.

2. An umbrella holder comprising, a substantially cone-shaped member adapted to be secured to the side of the interior of an automobile body substantially underneath the instrument panel thereof and having its lower end extending beneath the floor of the automobile, and a tubular member secured to the end of the cone-shaped member and extending rearwardly underneath said floor, whereby moisture from the umbrella will be drained through said tube.

3. An umbrella holder comprising, a substantially cone-shaped member adapted to be secured to the side of the interior of an automobile body substantially underneath the instrument panel thereof and having its lower end extending beneath the floor of the automobile, a tubular member secured to the end of the cone-shaped member underneath said floor, and means in the reduced end of the cone-shaped member for engaging the end of the umbrella to hold the umbrella loosely therein, whereby moisture from the umbrella will be drained through said tube.

ROBERT E. NORTHCUTT.

REFERENCES CITED

The following references are of record in the file of this patent:

UNITED STATES PATENTS

| Number | Name | Date |
| --- | --- | --- |
| 434,304 | Strong | Aug. 12, 1890 |
| 1,694,060 | Duncan | Dec. 4, 1928 |
| 1,892,601 | Beehler | Dec. 27, 1932 |
| 1,904,510 | Mott | Apr. 18, 1933 |
| 2,140,870 | Emery | Dec. 20, 1938 |